April 25, 1961  A. W. BLANSHINE ET AL  2,981,045
ROW CROP ATTACHMENT FOR FORAGE HARVESTER
Filed Oct. 29, 1958  2 Sheets-Sheet 1

INVENTOR
ALLISON W. BLANSHINE
AND ROBERT L. STEELY

By
ATTORNEY

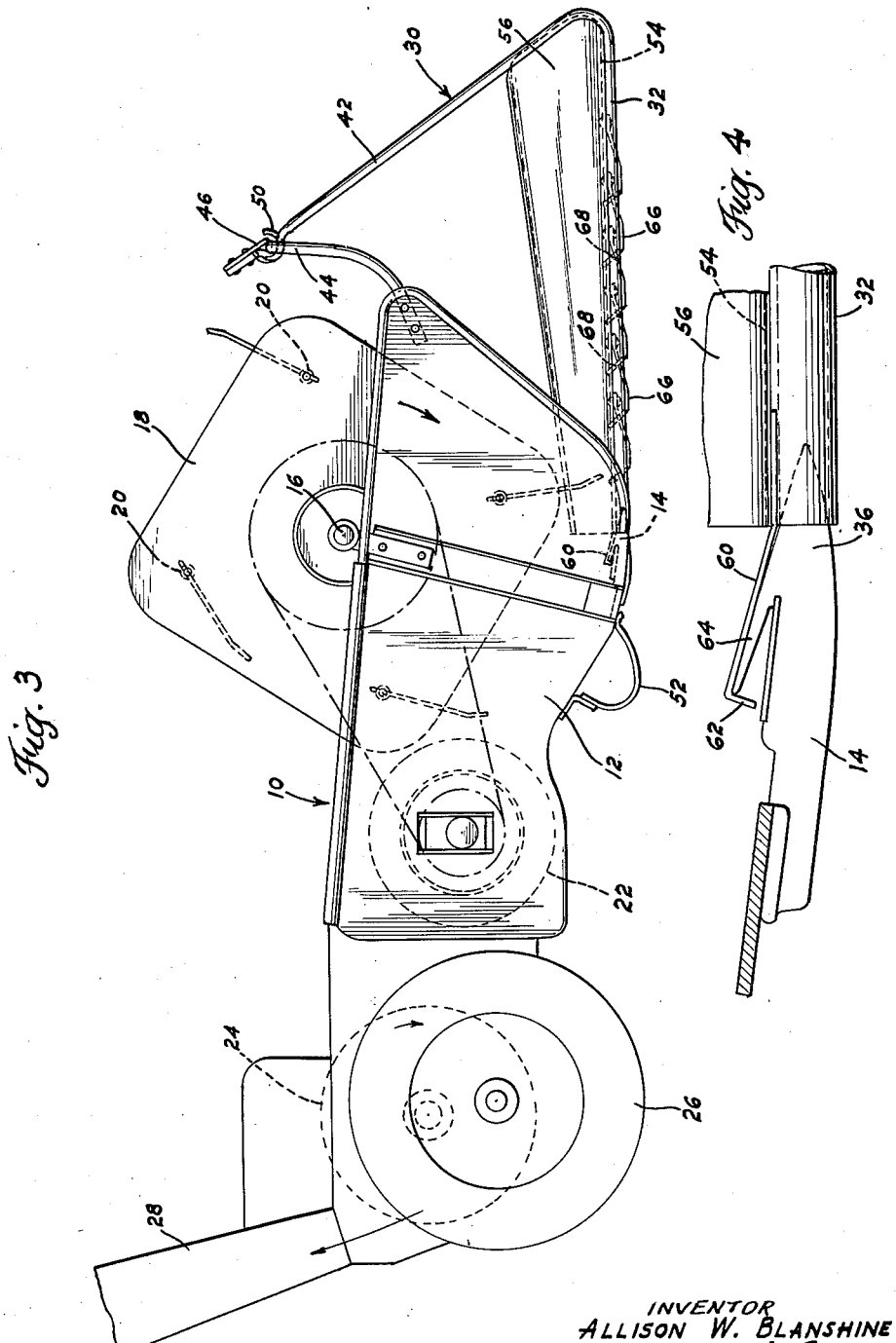

United States Patent Office 2,981,045
Patented Apr. 25, 1961

2,981,045

ROW CROP ATTACHMENT FOR FORAGE HARVESTER

Allison W. Blanshine, Lititz, and Robert L. Steely, Denver, Pa., assignors to Sperry Rand Corporation, New Holland, Pa., a corporation of Delaware Filed Oct. 29, 1958, Ser. No. 770,438

9 Claims. (Cl. 56—99)

This invention relates to an agricultural accessory arranged to be attached to a forage harvester or similar sickle bar-type implement for purposes of rendering the same capable of harvesting row crops and, more particularly, to permit the harvesting of row crops by a forage harvester in order that the row crops may be fed by the harvester to the cutting or chopping mechanism of the harvester for purposes of forming silage, or the like.

Various types of agricultural implements have been devised which employ a sickle bar of substantial length, primarily designed to cut crops which have been planted by a drill or otherwise are distributed substantially evenly over a field, as distinguished from crops which are planted in rows. Many types of silage crops such as alfalfa are harvested by an implement known as a forage harvester having a sickle bar adjacent the forward edge so as to cut a substantial swath of the crop and usually a reel is rotated to insure the feeding of the cut crop to the mechanism otherwise carried by the harvester such as compressing means, cutting or chopping mechanism, and a blower by which the chopped crop is blown into a wagon or other similar vehicle following the harvester. Such harvesters operate satisfactorily relative to field crops such as alfalfa or other closely growing silage crops. When, however, row crops such as corn are to be harvested, it usually is necessary to employ a specific type of harvesting implement designed especially to harvest such row crops, usually because of the height of the crop which considerably exceeds that of a crop for which a forage harvester for example, normally is designed to be capable of handling. Such additional equipment to harvest row crops obviously adds to farming expense.

It is the principal object of the present invention to provide an attachment for a conventional agricultural implement such as a forage harvester which includes a sickle bar, said attachment being designed so as to be extremely simple and inexpensive to manufacture, yet render such forage harvester capable of harvesting row crops in suitable manner to not only cut the crop but also feed and guide it into the harvester, whereby the same may be cut or chopped for silage, for example, and transferred to suitable container means such as a wagon which trails the harvester during operation thereof through a field to be harvested.

Another object of the invention is to construct the aforementioned attachment in such manner that it not only may be quickly attached to a forage harvester but also utilizes certain suitable portions and elements of the harvester to effect the positioning and securing of the attachment thereto.

A further object of the invention is to provide a row crop attachment for a forage harvester which is simple and relatively inexpensive in construction and includes means to engage the upper portions of the row crop and push the same forwardly incident to being harvested, whereby the cut crop is fed with the butt ends thereof extending rearwardly while being moved into the harvester for further processing such as chopping.

Still another object of the invention is to provide deck plate means on the attachment which are supported thereby for movement respectively along opposite sides of the row of the crop being harvested so as to receive the same when knocked down by the push bar of the attachment and cut by the sickle bar of the harvester, and constricting means positioned above the outer side edges of the deck plates to guide the crop when pushed forwardly onto the deck plates and also prevent the escape of the cut crop material while being moved rearwardly along said deck plates to the harvester.

A still further object of the invention is to provide preferably spring tines which are carried by said deck plates and extend angularly rearwardly into a longitudinally extending space between the deck plates through which the crop row passes, said tines being operable to prevent the movement of the crop material forwardly relative to the deck plates incident to being harvested.

Still another object of the invention is to form the principal supporting means of the attachment from tubular material such as pipe of adequate gauge and diameter, and a pair of such members each have portions which extend forwardly, in transversely spaced relationship to each other from the sickle bar substantially horizontally to provide a longitudinal opening therebetween parallel to the path of movement of the harvester, said members at the forward ends of the horizontal portions thereof being bent to extend upwardly and rearwardly toward the forward end of the harvester and are attachable thereto to form a support for the forward end of the attachment.

The rearward ends of the horizontal portions of the tubular members telescopically receive spaced fingers of the sickle bar so as to position said members relative to the sickle bar, and deck plates are attached to the horizontal portions of said tubular members to comprise chute means upon which the cut crop is supported while being moved into the harvester, the rearward ends of the deck plates having means overlying the fingers of the sickle bar and downwardly projecting extensions engaging behind portions of certain fingers thereof to prevent accidental removal of the atachment from the sickle bar.

Details of the foregoing objects and of the invention, as well as other objects thereof, are set forth in the following specification and illustrated in the drawings comprising a part thereof.

In the drawings:

Fig. 3 is a side view of the forage harvester shown in Fig. 1 with the auxiliary implement or attachment comprising the present invention attached to the forward end thereof, the scale being the same as that used in Fig. 2 and this view showing more details of the harvester than are illustrated in Figs. 1 and 2.

Fig. 4 is a fragmentary sectional view taken on the line 4—4 of Fig. 2 and illustrating in a larger scale than in any of the preceding figures means for securing the lower rearward end of the auxiliary implement or attachment to the fingers of the sickle bar.

Figure 1:
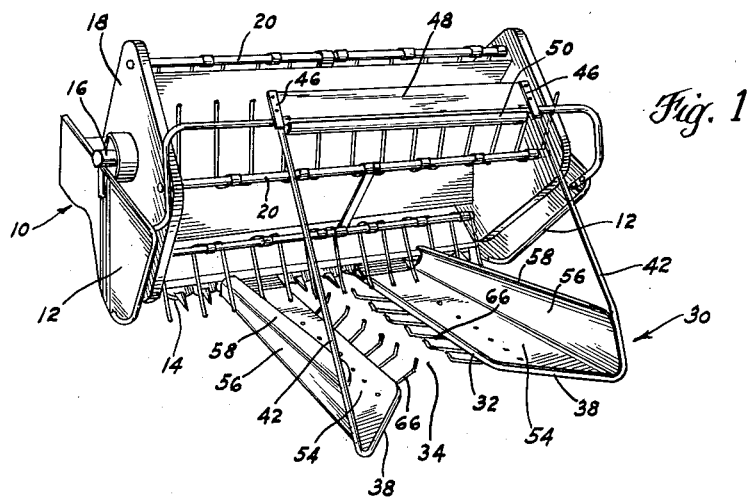
Fig. 1 is a perspective view of the forward end of a conventional agricultural implement such as a forage harvester to which an auxiliary implement or attachment comprising the present invention is attached to render the harvester capable of harvesting row crops.

It is to be understood that the forage harvester selected for illustration in the drawings comprising a part of this application is merely used for illustrative purposes and represents a class of harvesting implement with which the present invention might be utilized to render the same capable of harvesting row crops. Hence, such illustration is not to be regarded as restrictive.

Referring to Figs. 1 and 3 particularly, the exemplary forage harvester 10 comprises a pair of side plates 12 between which is mounted a conventional sickle bar 14, the cutting blade of the sickle bar being reciprocable by conventional mechanism not illustrated herein. Also extending between the side plates 12 and rotatable about a transverse shaft or trunnions 16 is a reel 18 having a plurality of finger bars 20 mounted adjacent the periphery thereof, the bars 20 extending transversely and being arranged successively to move crop material toward the sickle bar 14.

In the conventional operation of the forage harvester 10, after the crop material has been moved by the reel 18 into engagement with the sickle bar 14 and is cut by the latter, it is moved by the reel into an auger which operates to compress the material laterally from opposite sides toward the center of harvester for feeding between conventional rollers or the like, not illustrated in detail, to the somewhat diagrammatically illustrated combination cutter or chopping mechanism and blower 24. After being chopped by the latter, a blower of unit 24 propels the chopped crop material by an air blast into the discharge spout 28 for transfer to a suitable wagon or other storage means in which the chopped crop is accumulated until moved to a silo for example. Wheels 26 support the rear portion of the unit for travel along the ground.

The forage harvester described hereinabove is not suited for the efficient harvesting of row crops such as corn for reasons which will be obvious from a mere superficial study of Fig. 3 for example. At least a substantial portion of corn merely would be knocked down and overridden by the harvester if used as conventionally employed to harvest close growing crops such as alfalfa. The principal shortcoming of a conventional forage harvester for harvesting a row crop such as corn is in regard to suitably arranging the row crop for engagement by the sickle bar and thereafter insuring that the cut crop will be moved from the sickle bar into the interior of the harvester by the reel 18.

According to the principles of the present invention, a row crop auxiliary implement or attachment 30 embodies an extremely simple and unique design of feeding and guiding means which is readily connectable to the forward end of a conventional harvesting implement such as the forage harvester 10. Details of the row crop attachment 30 now will be described.

The row crop attachment 30 comprises a pair of elongated members 32 which, preferably, are tubular, such as metal pipe of suitable diameter and gauge, the members 32 being spaced apart transversely to provide an elongated opening 34 extending in the direction of movement of the harvester 10 for purposes of receiving a row crop such as corn or the like within said elongated opening until the advancing movement of the harvester causes the sickle bar 14 to engage and cut the crop adjacent the lower end thereof. The lower portions of the elongated members 32 are substantially horizontal and extend forwardly from the tine bar 14, the rearward tubular ends of the members 32 being received telescopically upon spaced fingers 36 of the sickle bar 14 for positioning of the rearward ends of members 32 relative to the sickle bar. Means to be described hereinafter secure the rearward ends of members 32 upon the fingers 36 so that they may not accidentally become disengaged therefrom.

Figure 2:
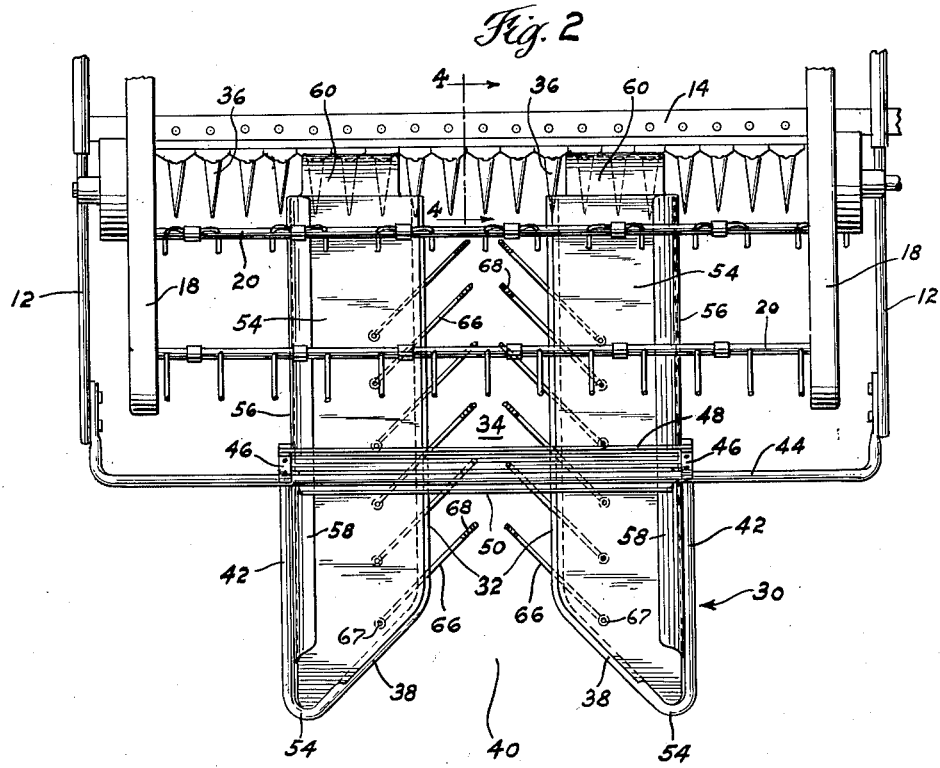
Fig. 2 is a top plan view of the forward end of the forage harvester shown in Fig. 1 with the auxiliary implement or attachment comprising the invention attached thereto, Fig. 2 being on a substantially larger scale than Fig. 1.

The forward end portions 38 of the horizontal members 32 are bent respectively away from each other within a substantially horizontal plane, as shown in Figs. 1 and 2, to provide a flared mouth 40 for the elongated opening 34 and the outer ends of the forward end portions 38 then are bent upwardly and rearwardly to provide a pair of parallel supporting members 42. Extending between the side plates 12 of harvester 10 and connected at its opposite ends thereto is a transverse, horizontal bar 44 to which the upper ends of supporting members 42 are connected by any suitable means such as a pair of clamping fingers 46. Particularly for purposes of harvesting corn, it is preferred that the bar 44 be about three feet above the ground.

Extending between the upper ends of the supporting members 42 is an elongated, plate-like push bar 48, the lower edge of which is curved to provide an operative pushing edge 50 as best shown in Figs. 1 and 3. Hence, it will be seen that the supporting members 42 not only support push bar 48 but also support the forward ends of the elongated members 32 relative to the harvester 10. Further, it will be noted that the push bar 48 is substantially above and forwardly of the sickle bar 14 as is best shown in Fig. 3.

Normally the sickle bar 14 is supported a few inches above the ground by skids 52 and, inasmuch as the row crop attachment 30 is supported quite rigidly by the forward end portion of the harevster 10, it will be seen from Fig. 3 particularly that the curved nose portions 54 at the forward ends of the members 32, 38 will prevent the forward end of the row crop attachment from digging into the ground in the event said forward ends should engage the ground and especially uneven portions thereof. Further, the elongated members 32 are suited to act as skids for the row crop attachment if uneven conditions of the ground cause the attachment to engage the same.

The row crop attachment 30 also includes a pair of preferably flat and substantially horizontal deck plates 54 which are connected respectively along one edge to the elongated members 32 by welding or any other suitable means. Said plates extend laterally outward in opposite directions from the horizontal members 32 and are parallel to the ground. The forward ends of the deck plates 54 are similar in shape to the forward end portions 38 of members 32 and the opposite edges of deck plates 54 extend upwardly to comprise elongated sides 56 which are best shown in Figs. 1 and 3. Preferably the upper edges of the sides 56 are bent inwardly to comprise flanges 58 directed respectively toward each other so as to provide means to confine the forage crop after the same is cut by the sickle bar 14, thereby insuring that the cut crop will rest upon the deck plates 54 and be guided to the inner ends thereof, past the sickle bar 14, and into the interior of the harvester 10, the reel 18 functioning to facilitate such movement. In effect, it will be seen that the deck plates 54, sides 56, and flanges 58 thereof comprise an elongated chute means adjacent opposite sides of the row of crop material to receive the knocked down and/or cut forage material to support and guide the same for the purposes described above. Further, the elongated sides 56 and flanges 58 of the deck plates 54 comprise stiffening means for the outer edges of said plates, while the inner edges thereof are adequately supported by the elongated members 32, to which they are connected.

Affixed to the inner ends of deck plates 54 are plate-like extension means 60, the rearward terminal ends of said extension means being bent downwardly to comprise locking flanges 62 which engage behind the rearward end of the extensions 64 of fingers 36 of the sickle bar 14. The extension means 60 preferably are flexible and are made from suitable material such as spring steel, whereby they comprise latches to secure the inner ends of tubular elongated members 32 in telescopic relationship with the forward ends of fingers 36 of sickle bar 14, thereby preventing accidental disengagement of members 32 from fingers 36, particularly when it might be necessary to back-up the harvester 10. Extension means 60 also serve to guide the cut crop material over sickle bar 14. Such extension means 60 may be flexed upwardly when desired to release the locking flanges 62 from engagement with upper extensions 64 of the fingers 36 when it is desired to detach the row crop attachment 30 from the harvester 10. Details of the latch connections of the members 32 with the fingers 36 are best shown in Fig. 4.

Extending rearwardly and inwardly at an angle from the inner edges of the deck plates 54 are a plurality of spring tines 66. These are connected at one end to the deck plates by any suitable means such as bolts or rivets 67 and are parallel to plates 54, while the opposite ends thereof preferably are bent so as also to extend rearwardly but upwardly at an angle of substantially 45° to the horizontal. Such angular relationship of the inner ends 68 to the deck plates 54 is best seen by viewing Figs. 2 and 3 relative to each other. The tines 66 and the inner ends 68 thereof are arranged as described so as to permit the ready passage of a row of crop material such as corn stalks through the elongated opening 34 without appreciable interference but, particularly after such stalks are cut, said tines and the inner ends thereof will prevent such stalks from slipping either forwardly or laterally inward from said tines and from the deck plates 54 during the harvesting operation.

In addition to the members 42 serving to support the outer end of the row crop attachment or auxiliary implement, they also serve as confining members extending upwardly and rearwardly from said front end of deck plates 54 to prevent the row crop material from spreading laterally from the opposite sides of the elongated opening 34 and the elongated chute comprising deck plates 54. As is evident from Fig. 2 particularly, the confining members 42 are substantially vertically above the elongated sides 56 of the chute means at the outer side edges of the deck plates 54 and, in effect, comprise vertical extensions thereof. Especially when tall row crop material such as corn, sorghum and the like is pushed forward, such as by push bar 48, incident to being cut, the confining means 42 will guide it during its downward movement toward deck plates 54, whereby, when the crop is cut, it will be received and supported upon the deck plates 54 comprising the bottom of the elongated chute at opposite sides of the elongated opening 34 through which the row of crop material moves prior to being cut by the sickle bar unit 14.

From the foregoing, it will be seen that the row crop attachment or auxiliary implement 30 comprising the present invention is simple and rugged, is easily attached to an agricultural implement such as a forage harvester, and adapts the harvester for the harvesting of row crops by facilitating the directing of the row of crops to the sickle bar of the harvester and also guiding and controlling the same, after being cut, to the various co-operable elements of the harvester so that the crop may be passed through the harvester and chopped into silage for example with the same facility that other forage crops are handled by the harvester such as those for which the harvester is primarily designed to harvest such as crops which grow closely together, of which alfalfa is one example.

The row crop attachment is relatively fool-proof in operation and not only includes means to receive and guide the cut row crops to the interior of the harvester but also prevents the accidental escape of the crops from the attachment while the crops are being moved into the harvester. The attachment also includes a push bar which engages the upper portions of stalk-type row crops, such as corn, and knocks the same somewhat forwardly prior to being cut by the sickle bar of the harvester, whereby the lower ends of the cut row crop material are fed rearwardly into the harvester and the elongated nature of the row crop material will not impede the operation of the harvester but, rather, adapts the row crop material to the operating elements of the harvester such as the reel, auger, and cutter or chopping mechanism.

While the invention has been described and illustrated in its several preferred embodiments, and has included certain details, it should be understood that the invention is not to be limited to the precise details herein illustrated and described since the same may be carried out in other ways falling within the scope of the invention as claimed.

We claim:

1. A row crop attachment for use with a sickle-type harvester comprising a frame, a plurality of laterally arranged sickle guards on said frame, a cross-bar on said frame above said guards, and a pair of laterally spaced crop dividers each having an upper portion having selective engagement with said cross-bar and each of said dividers having a lower portion having engagement with at least a selected one of said guards, whereby said dividers may be adjustably positioned laterally of said frame of said harvester.

2. For use with a forage harvester having a sickle bar provided with fingers and a reciprocating cutter, an attachment to facilitate the harvesting and feed of row crops to the sickle bar of said harvester and comprising in combination, a frame narrower than the length of said sickle bar attachable to the forward end of said harvester adjustably in a direction transversely to the direction of harvesting movement of the harvester and having an opening extending longitudinally in the direction of movement of the harvester from the forward to the rearward end thereof in use adjacent said sickle bar to receive a row of crops and guide the same to said sickle bar for cutting thereby, said frame of said attachment having means at the rear lower edge thereof attachable to said sickle bar coincident and selectively with the fingers thereon, and a push bar on said frame extending transversely to said longitudinal opening and positioned above said sickle bar and forwardly thereof to engage the upper portion of said crops while being harvested and push the same forwardly prior to being cut by said sickle bar, thereby positioning said crops for feed into said harvester with the cut ends extending rearwardly.

3. For use with a forage harvester having a substantially horizontal sickle bar cutter and frame means extending vertically from the opposite ends of said sickle bar, an attachment to facilitate the harvesting and feed of row crops to the sickle bar of said harvester and comprising in combinaiton, a substantially horizontal bar connectable to said frame means in spaced relation above said sickle bar cutter and parallel thereto, a frame attachable to the forward end of said harvester in advance of the sickle bar and comprising a pair of elongated members arranged to be connected at the rear end to and extend forwardly from said sickle bar and substantially parallel to the ground and spaced apart in a direction transverse to said members to provide a pair of crop dividers having therebetween an opening extending longitudinally in the direction of movement of the harvester from the forward to the rearward end of said members in use to receive a row of crops and guide the same to said sickle bar, said members having extensions directed upwardly therefrom for attachment to said horizontal bar to support the forward end of said frame therefrom, and a substantially horizontal push bar on said frame extending transversely to said longitudinal opening and positioned above said opening and sickle bar to engage the upper portion of said crops while being harvested and push the same forwardly prior to being cut by said sickle bar, thereby positioning said crops for feed into said harvester with the cut ends extending rearwardly, the connections of said attachment to said horizontal bar and sickle bar comprising the sole attaching means therefor to said harvester.

4. For use with a forage harvester having a sickle bar provided with spaced fingers and a reciprocating cutter, an attachment to facilitate the harvesting and feed of row crops to the sickle bar of said harvester and comprising in combination, a frame attachable to the forward end of said harvester in advance of the sickle bar and comprising a pair of elongated rail-like members having socket means on the rearward ends positionable telescopically respectively upon selected spaced fingers of said sickle bar intermediately between the ends thereof and said members being spaced apart in a direction transverse to said members to provide a pair of crop dividers having therebetween an opening extending longitudinally in the direction of movement of the harvester from the forward to the rearward end thereof in use to receive a row of crops and guide the same to said sickle bar, said members at the forward ends having extensions continuous therewith and directed upwardly and rearwardly for attachment to said harvester to support the forward end of said frame, and a push bar extending between the upper ends of said extensions and supported thereby to extend transversely to said longitudinal opening and positioned thereabove and above said sickle bar and forwardly thereof to engage the upper portion of said crops while being harvested and push the same forwardly prior to being cut by said sickle bar, thereby positioning said crops for feed into said harvester with the cut ends extending rearwardly.

5. For use with a forage harvester having a substantially horizontal sickle bar provided with a reciprocating cutter, an attachment to facilitate the harvesting and feed of row crops to the sickle bar of said harvester and comprising in combination, a frame attachable to the forward end of said harvester in advance of the sickle bar and comprising a pair of elongated members arranged to extend forwardly from said sickle bar substantially parallel to the ground and spaced apart in a direction transverse to said members to provide therebetween an opening extending longitudinally in the direction of movement of the harvester from the forward to the rearward end thereof in use to receive a row of crops and guide the same to said sickle bar, said members at the forward ends having extensions connected thereto and directed upwardly and rearwardly for attachment to said harvester to support the forward end of said frame relative to said harvester, a push bar on said frame extending transversely across said longitudinal opening and positioned above said sickle bar and forwardly thereof to engage the upper portion of said crops while being harvested and push the same forwardly prior to being cut by said sickle bar, thereby positioning said row crops for feed of the cut end foremost into said harvester, and deck plates connect to and carried respectively by said elongated members substantially horizontally along opposite sides of said longitudinal opening and extending forwardly from said sickle bar to receive said row crops when cut and felled forwardly by said push bar and support the same for movement rearwardly into said harvester, the rearward ends of said deck plates having projections latchably engageable with said sickle bar to secure said rearward end of said frame against accidental removal from said sickle bar.

6. For use with a forage harvester having a sickle bar provided with a reciprocating cutter, an attachment to facilitate the harvesting and feed of row crops to the sickle bar of said harvester and comprising in combination, a frame attachable to the forward end of said harvester in advance of the sickle bar and comprising a pair of elongated members arranged to extend forwardly from said cutter bar and positioned substantially parallel to the ground and spaced apart in a direction transverse to said members to provide therebetween an opening extending longitudinally in the direction of movement of the harvester from the forward to the rearward end to receive a row of crops and guide the same to said sickle bar, said members at the forward ends having extensions connected thereto and directed upwardly and rearwardly for attachment to said harvester to support the forward end of said frame, a push bar on said frame extending transversely across said longitudinal opening and positioned above said sickle bar and forwardly thereof to engage the upper portion of said row crops while being harvested and push the same forwardly prior to being cut by said sickle bar, thereby positioning said crops for feed into said harvester with the cut ends extending rearwardly, substantially horizontal deck plates connected to and carried respectively by said elongated members along opposite sides of said longitudinal opening and extending forwardly from said sickle bar to receive cut crops and support the same when cut for movement into said harvester, latch means at the rearward ends of said deck plates having projections engageable with said sickle bar to secure said rearward end of said frame against accidental removal from said sickle bar, and spaced spring tine members attached at one end to said deck plates and extending at an angle rearwardly and into said opening between said inner edges of said plates, the other ends of said tines being bent angularly upward to prevent crops from slipping from between said tines while being harvested.

7. For use with a forage harvester having a sickle bar and cutter, an attachment to facilitate the harvesting and feed of row crops to the sickle bar of said harvester and comprising in combination, a substantially horizontal bar connectable to said frame means in spaced relation above said sickle bar and parallel thereto, a frame attachable to the forward end of said harvester in advance of the sickle bar and comprising a pair of elongated horizontal members connectable at the rearward ends to said sickle bar and extending forwardly therefrom in use parallel to the direction of movement of the harvester and substantially parallel to the ground and transversely spaced from each other to provide an elongated opening to receive a row of crops and guide the same to said sickle bar, the forward ends of said members being bent upwardly and rearwardly to said harvester when in use to form extensions for connection at the upper ends thereof to said horizontal bar to support the forward end of said frame relative to said harvester, and a pair of substantially flat elongated deck plates connected at one edge to said elongated members and respectively extending laterally therefrom away from said elongated opening and positioned substantially parallel to the ground in use to provide supporting means at each side of said elongated opening to receive a row of crops when cut and while being moved to said harvester, the connections for the rear ends of said horizontal members to said sickle bar and upper ends of said extensions to said horizontal bar comprising the sole attaching means therefor to said harvester.

8. For use with a forage harvester having a sickle bar provided with a reciprocating cutter, an attachment to facilitate the harvesting and feed of row crops to the sickle bar of said harvester and comprising in combination, a frame narrower than the length of said sickle bar attachable to the forward end of said harvester adjustably in a direction parallel to said sickle bar in advance thereof and comprising a pair of elongated horizontal members connectable adjustably at one end to said sickle bar and extending forwardly therefrom in use parallel to the direction of movement of the harvester and substantially parallel to the ground and transversely spaced from each other to provide an elongated opening to receive a row of crops and guide the same to said sickle bar, rod-like supporting members connected to the forward ends of said members and extending upwardly and rearwardly therefrom for connection to said harvester adjustably in a direction parallel to said sickle bar to support the forward end of said frame relative thereto, and a pair of substantially horizontal elongated deck plates connected respectively at one edge to said elongated members and extending laterally therefrom away from said elongated opening and the inner end portions of said plates overlying the fingers of the sickle bar of the harvester when connected adjustably thereto and the terminal ends of said inner end portions being bent downwardly to be disposed behind a portion of said fingers to prevent accidental disconnection of said attachment from said harvester, whereby said plates comprise a chute to receive and support a row of crops when cut and while being moved rearwardly along said chute to said harvester.

9. For use with a forage harvester having a sickle bar provided with a reciprocating cutter, an attachment to facilitate the harvesting and feed of row crops to the sickle bar of said harvester and comprising in combination, a frame attachable to the forward end of said harvester in advance of the sickle bar and comprising a pair of elongated horizontal members connectable at one end to said sickle bar and extending forwardly therefrom in use parallel to the direction of movement of the harvester and substantially parallel to the ground and transversely spaced from each other to provide an elongated opening to receive a row of crops and guide the same to said sickle bar, the forward ends of said members being disposed at opposite angles forwardly and laterally away from each other to provide a flared mouth for said elongated opening, extensions connected to said forward ends of said members and extending upwardly and rearwardly to a portion of said harvester spaced above said sickle bar in use for connection of said extensions to said harvester to support the forward end of said frame therefrom, and a pair of elongated deck plates substantially coextensive in length with said horizontal members and connected at one edge to said elongated members and respectively extending laterally away from said elongated opening and positioned substantially parallel to the ground in use and the outer edges of said plates being bent upwardly and terminating in inwardly bent edges directed toward each other to provide sidewalls and also to brace said plates at the outer edges thereof, whereby said plates comprise a horizontal chute to receive and confine a row of crops when cut and while being moved to said harvester.

References Cited in the file of this patent
UNITED STATES PATENTS

| | | |
|---|---|---|
| 1,793,931 | Hei et al. | Feb. 24, 1931 |
| 1,800,058 | Dugger | Apr. 7, 1931 |
| 2,044,396 | Perau | June 16, 1936 |
| 2,634,569 | Raney et al. | Apr. 14, 1953 |
| 2,713,240 | West | July 19, 1955 |
| 2,737,770 | Wigham | Mar. 13, 1956 |